(12) United States Patent
Bugler et al.

(10) Patent No.: US 6,481,155 B1
(45) Date of Patent: Nov. 19, 2002

(54) PLANT PROPAGATION

(75) Inventors: David John Bugler; Sharon Lee Bugler, both of Caboolture (AU)

(73) Assignee: Kooringa Nursery Pty Ltd, Caboolture (AU)

( * ) Notice: Subject to any disclaimer, the term of this patent is extended or adjusted under 35 U.S.C. 154(b) by 0 days.

(21) Appl. No.: 09/853,994

(22) Filed: May 11, 2001

(51) Int. Cl.$^7$ .......................... A01G 23/02; A01G 13/02
(52) U.S. Cl. ........................... 47/58.1; 47/32.6; 47/32.3
(58) Field of Search ................................. 47/23.1, 23.2, 47/29.6, 32.4, 32.6, 3, 30, 65.7, 65.8, 66.7, 73, 75, 77, 58.1, 32.3

(56) References Cited

U.S. PATENT DOCUMENTS

| | | | | |
|---|---|---|---|---|
| 361,241 A | * | 4/1887 | Rugg | 47/3 |
| 464,879 A | * | 12/1891 | Knapp | 47/32.4 |
| 2,033,627 A | * | 3/1936 | Gardner | 47/84 |
| 4,641,457 A | * | 2/1987 | Sandin | 47/9 |
| 5,016,548 A | * | 5/1991 | Ito | 111/114 |
| 5,347,750 A | * | 9/1994 | Mills | 47/30 |
| 5,581,935 A | * | 12/1996 | Anderson | 47/23 |
| 5,692,337 A | * | 12/1997 | Motz, Jr. | 47/30 |

\* cited by examiner

Primary Examiner—Peter M. Poon
Assistant Examiner—Son T. Nguyen
(74) Attorney, Agent, or Firm—Olive & Olive

(57) ABSTRACT

A method of cultivating a plant is disclosed which meets certain aesthetic and other requirements. A plant (8) is stripped of any unwanted growth from its stem (9) leaving the upper foliage (10) in place. The thus stripped stem (9) is then passed through the full length slot (2) of a first sleeve (1) to retain the stem (9) within the sleeve (1). A hollow frusto-conical retainer (3) is then positioned with its smaller end in communication with the upper end of the sleeve (1), the upper foliage (10) being passed through a slot (4) to be encapsulated within the retainer (3). The retainer (3) is then rotated to misalign the respective slots (2), (4). The sleeve (1) and retainer (3) are then moved upwards until the upper foliage (10) is also encapsulated within the first sleeve (1). The retainer (3) is then removed and a wire (11) is attached to the upper end of the sleeve (1). A second sleeve (5) is then slid over the wire (11) and first sleeve (1). The encapsulated plant with sleeves (1), (5) in position is then placed into any appropriate growing medium retained in any suitable container (12). By pulling on the wire (11) the first sleeve (1) is withdrawn from the second sleeve (5) exposing the upper foliage (10). The outer surface of the sleeve (5) is of a decorative plain or textured nature.

10 Claims, 4 Drawing Sheets

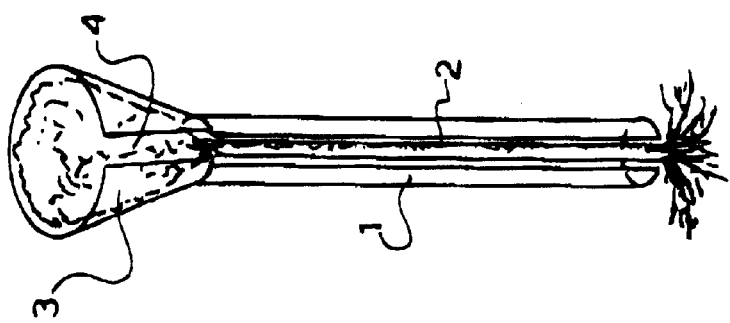
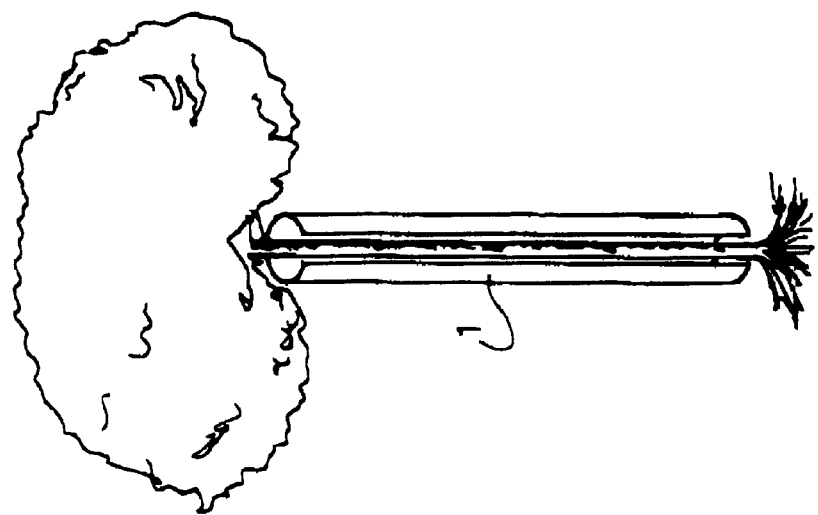
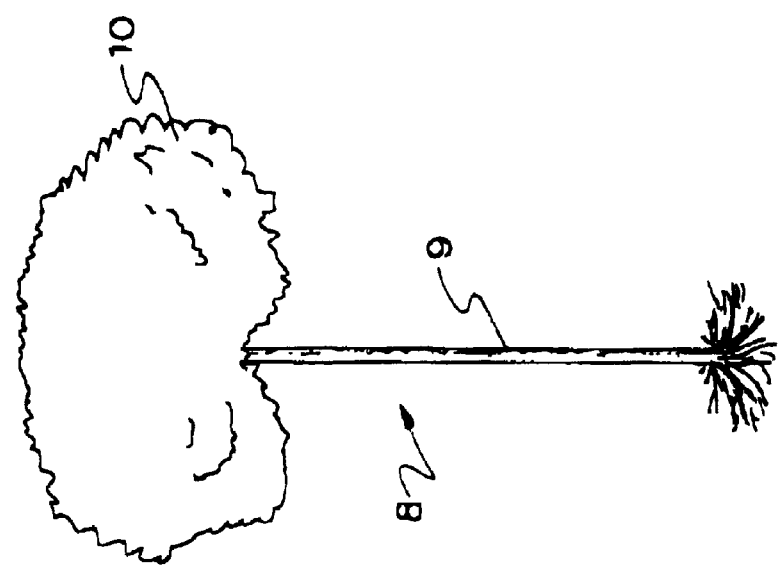

PLANT PROPAGATION

BACKGROUND OF THE INVENTION

THIS INVENTION relates to horticulture. In particular, it is directed to a method of cultivating a plant to meet certain aesthetic and other requirements.

BRIEF SUMMARY OF THE INVENTION

Gardening is a popular pastime. Many people want to create a garden that reflects their individual preferences for style of garden, selection of plant species, etc. Often, such a garden will include a plant specimen(s) as a feature of that garden. This specimen could be chosen for its height, colour or shape of its foliage, etc. Alternatively, such a specimen plant could be pruned to a particular shape—the well known practice of topiary.

Another style of plant pruning that is popular is where the stem of the plant is essentially bare of growth and the foliage is concentrated at the top of the plant. For extra effect, the bare stem may be decorated with coloured ribbon or the like.

At present, to achieve such a decorative plant is labour extensive as any unwanted growth on the stem has to be regularly removed manually. This is a particularly time-consuming requirement for a plant nursery where large numbers of such plants have to be propagated for sale. It is also time-consuming for the eventual purchaser of the plant who has to undertake the necessary pruning for the life of the plant if the decorative effect is to be maintained.

There is thus a need for a method of propagation which eliminates or at least ameliorates this disadvantage and provides a decorative plant more efficiently.

According to a first aspect of the present invention there is provided a method of propagating a plant, said method including:

if necessary, removing any unwanted growth below a desired height from the stem of said plant;

providing a first tubular sleeve having a full length longitudinal slot;

passing said stem through said slot to encapsulate said stem within said first sleeve;

providing an encapsulation means for the upper foliage of said plant, said encapsulation means being adapted to be in communication with said first sleeve;

encapsulating said upper foliage within said encapsulation means;

positioning said plant, and/or said first sleeve and said encapsulating means, so that substantially all of said stem and said foliage is encapsulated within said first sleeve;

removing said encapsulation means;

positioning a second tubular sleeve over said first sleeve; and removing said first sleeve;

wherein said second sleeve is selected such that, upon removal of said first sleeve, said second sleeve encapsulates said stem leaving said upper foliage substantially fully exposed.

Preferably, said encapsulating means is of hollow frusto-conical configuration having a slot extending from the base to the apex thereof.

Preferably, said second sleeve is tapered at the base thereof.

Preferably, said second sleeve has an outer surface of a decorative plain or textured nature, such as a paint coating, anodised surface or similar.

All components used in the present invention can be manufactured from any suitable material, rigid or flexible. A suitable rigid material is polyvinylchloride. A suitable flexible material is polyethylene.

According to a second aspect of the present invention, there is provided a plant wherein said plant has been propagated by a method as hereinbefore described.

BRIEF DESCRIPTION OF THE DRAWINGS

A preferred embodiment of the present invention will now be described with reference to the accompanying drawings wherein:

FIGS. 4a–4i depicts the sequential use of the components of FIGS. 1 to 3 in the present invention.

DETAILED DESCRIPTION OF THE INVENTION

Figure 3:
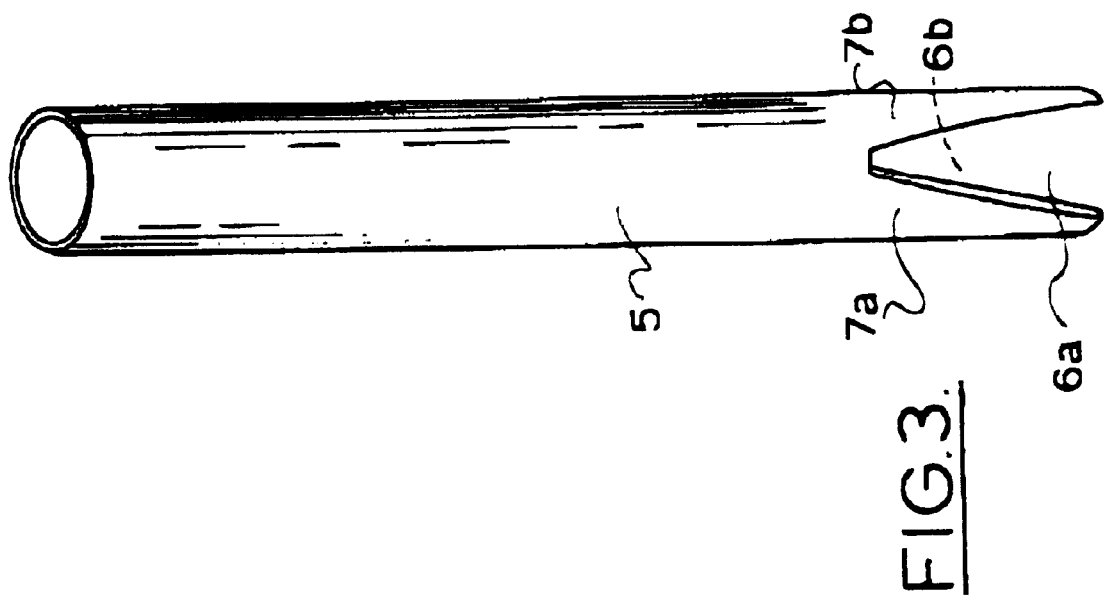
FIG. 3 depicts a third component of the present invention.
Figure 2:
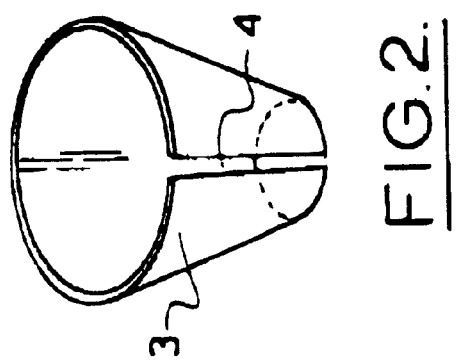
FIG. 2 depicts a second component of the present invention.
Figure 1:
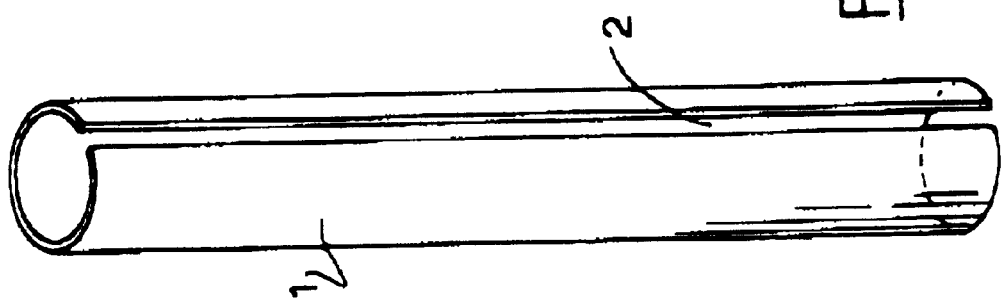
FIG. 1 depicts a first component of the present invention.

FIG. 1 depicts a tubular sleeve (1) of circular cross section having a full length slot (2). FIG. 2 depicts a frusto-conical retainer (3) with a full length slot (4) from its base to its apex. FIG. 3 depicts a second tubular sleeve (5) of circular cross section with a diameter sufficient for the sleeve (5) to slide over the first sleeve (1) when in use. The lower end of the sleeve (5) includes two cutouts (6a,b) to create two tapered portions (7a,b). The outer surface of the sleeve (5) is provided with any suitable decorative coating.

Figure 4F:
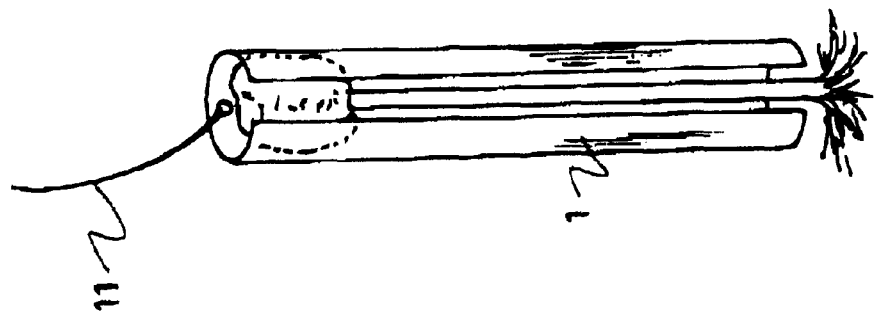
Figure 4E:
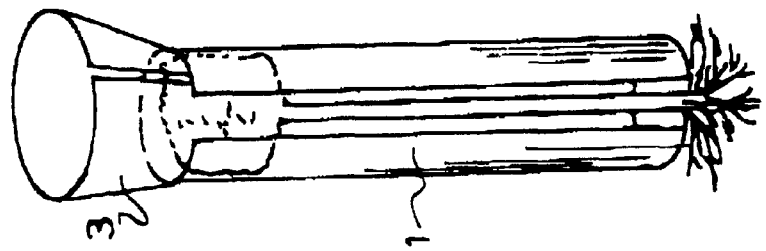
Figure 4D:
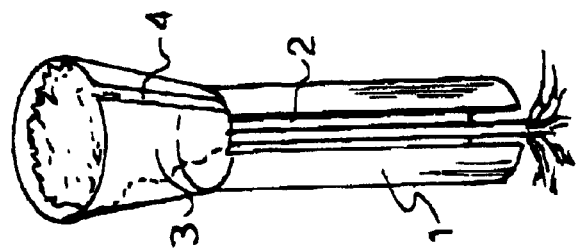
Figure 4I:
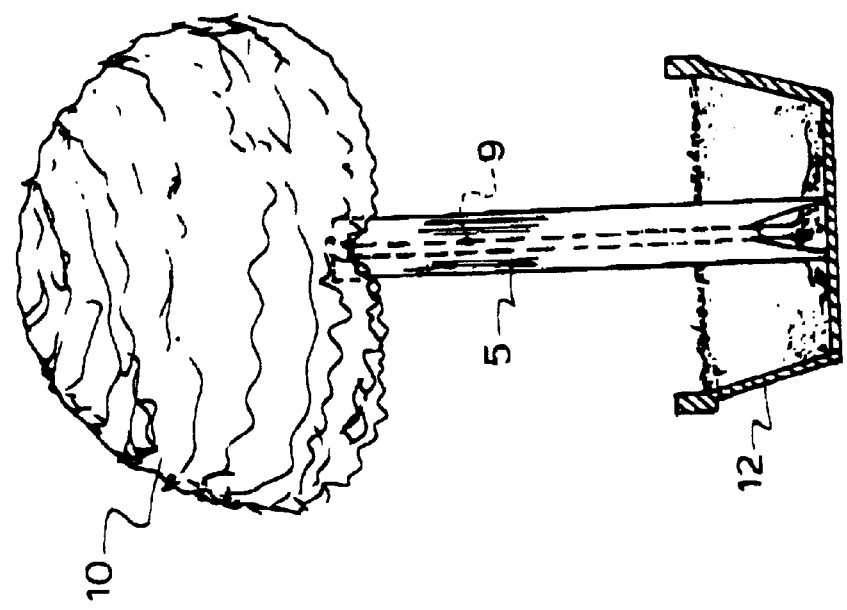
Figure 4H:
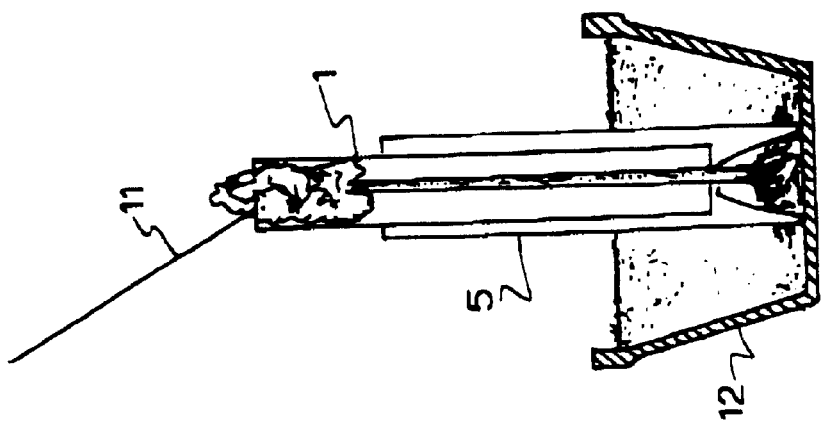
Figure 4G:
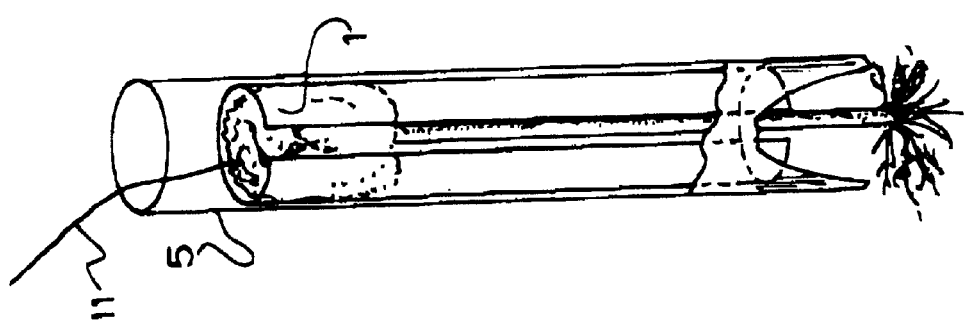

In use, a plant (8) is stripped of any unwanted growth from its stem (9) leaving the upper foliage (10) in place (FIG. 4a). The thus stripped stem (9) is then passed through the full length slot (2) of the sleeve (1) to retain the stem (9) within the sleeve (1) (FIG. 4b). The hollow frusto-conical retainer (3) is then positioned with its smaller end in communication with the upper end of the sleeve (1), the upper foliage (10) being passed through the slot (4) to be encapsulated within the retainer (3) (FIG. 4c). The retainer (3) is then rotated to misalign the respective slots (2), (4) (FIG. 4d). The sleeve (1) and retainer (3) are then moved upwards until the upper foliage (10) is also encapsulated within the sleeve (1), the frusto-conical shape of the retainer (3) guiding the foliage (10) with minimal damage thereto (FIG. 4e). The retainer (3) is then removed and a wire (11) is attached to the upper end of the sleeve (1) (FIG. 4f). The second sleeve (5) is then slid over the wire (11) and first sleeve (1) (FIG. 4g). The encapsulated plant with sleeves (1), (5) in position is then placed into any appropriate growing medium retained in any suitable container (12), the tapered portion of the sleeve (5) assisting in this placement (FIG. 4h). By pulling on the wire (11) the first sleeve (1) is withdrawn from the second sleeve (5) exposing the upper foliage (10) (FIG. 4i). It will be recognised that the respective lengths of the sleeves (1), (5) are chosen such that the first sleeve (1) can encapsulate sufficient of both the stem (9) and the upper foliage (10) of the plant (8) but that the second sleeve (5), when in position in the growing medium, only encapsulates the stem (9) leaving the upper foliage (10) exposed.

In addition to achieving the desired aesthetic effect and substantially eliminating the requirement of removing unwanted growth from the stem for the life of the plant, the present invention offers another advantage in that it can eliminate the necessity to use a separate stake for those plants which require such staking for support. The sleeve (5) acts as that support.

It will be appreciated that the above described embodiment is only an exemplification of the various aspects of the present invention and that modifications and alterations can be made thereto without departing from the inventive concept as defined in the following claims.

What is claimed is:

1. A method of propagating a plant, said method including:

removing any unwanted growth below a desired height from the stem of said plant;

providing a first tubular sleeve having a full length longitudinal slot;

passing said stem through said slot to encapsulate said stem within said first sleeve;

providing an encapsulation means for the upper foliage of said plant, said encapsulation means being adapted to be in communication with said first sleeve;

encapsulating said upper foliage within said encapsulation means;

positioning said plant, said first sleeve and said encapsulating means, so that substantially all of said stem and said foliage is encapsulated within said first sleeve;

removing said encapsulation means;

positioning a second tubular sleeve over said first sleeve; and removing said first sleeve;

wherein said second sleeve is selected such that, upon removal of said first sleeve, said second sleeve encapsulates said stem leaving said upper foliage substantially fully exposed.

2. A method as defined in claim 1, wherein said encapsulating means is of hollow frusto-conical configuration having a slot extending from a base to an apex thereof.

3. A method as defined in claim 1, wherein said second sleeve is tapered at its base.

4. A method as defined in claim 1, wherein said second sleeve has an outer surface of a decorative plain or textured nature.

5. A method as defined in claim 1, wherein said first sleeve is manufactured from a rigid material.

6. A method as defined in claim 1, wherein said second sleeve is manufactured from a rigid material.

7. A method as defined in claim 5 or 6, wherein said rigid material is polyvinylchloride.

8. A method as defined in claim 1, wherein said first sleeve is manufactured from a flexible material.

9. A method as defined in claim 1, wherein said second sleeve is manufactured from a flexible material.

10. A method as defined in claim 8 or 9, wherein said flexible material is polyethylene.

* * * * *